United States Patent [19]
Abele

[11] 4,313,345
[45] Feb. 2, 1982

[54] OUTDOOR WEATHER INSTRUMENTATION STATION

[76] Inventor: Alan C. Abele, P.O. Box 173-1, Zelienople, Pa. 16063

[21] Appl. No.: 155,613

[22] Filed: Jun. 2, 1980

Related U.S. Application Data

[62] Division of Ser. No. 18,737, Mar. 8, 1979, Pat. No. 4,233,841.

[51] Int. Cl.³ .......................................... G01D 11/24
[52] U.S. Cl. .................................................... 73/431
[58] Field of Search ...................... 73/431, 170 R, 340

[56] References Cited
U.S. PATENT DOCUMENTS 2,652,722  9/1953  Wood .............................. 73/431 X Primary Examiner—Jerry W. Myracle
Attorney, Agent, or Firm—Baldwin, Egan, Walling & Fetzer

[57] ABSTRACT

A weather instrumentation station including a louvered instrument housing containing weather instruments. An exterior double-walled housing radiation shield is disposed over the instrument housing in spaced relation thereto to shield the instrument housing from the sun. A double-walled auxiliary shield may be positioned over at least one open side of the housing shield in spaced relation thereto to shield sun rays from the instrument housing on such open side. The housing shield and the auxiliary shield inner walls are formed of thermoplastic or aluminized asbestos material, and the outer walls of stainless steel. The housing shield roof is peaked to forestall accumulation of water and snow thereon. The instrumentation station may have a chimney to increase interior air circulation.

There is also provided a rainwater gauge including a rainwater receiving flask with a funnel disposed over the flask to channel rainwater therein. The ratio of the area of the funnel top inlet opening to its lower outlet opening is preferably ten to one. An elongated, hollow, open-ended, stainless steel cylinder of minimal length may be detachably connected to the perimeter of the funnel upper inlet opening to channel rainwater to the funnel lower outlet opening. The cylinder upper edge may be a knife edge to ensure collecting a precise area of rainwater. The cylinder interior surface is coated with a hydrophobic material and the cylinder lower edge is a knife edge to overcome the surface tension of water droplets and thus ease their passage through the cylinder.

16 Claims, 9 Drawing Figures

OUTDOOR WEATHER INSTRUMENTATION STATION

This application is a division of my copending United States application Ser. No. 18,737, filed Mar. 8, 1979 for Rainwater Gauge, now U.S. Pat. No. 4,233,841.

This invention relates to outdoor weather instrumentation stations and is directed to devices for substantially improving the accuracy of the instrument readings thereof.

BACKGROUND OF THE INVENTION

The problem of securing highly accurate readings on outdoor weather instruments has been longstanding. The instruments must be placed in a fairly exposed outdoor position, yet by doing so, excessive exposure to the sun, wind and rain results in inaccurate readings. If the instruments are excessively shielded, inaccurate readings also result. If the instruments are placed in a housing, sufficient sun-shielding and adequate ambient flowing air circulation interiorly of the housing are essential.

With respect to rain gauges, there has been a persistent problem in securing accurate readings with exceedingly light amounts of rainfall such as with a mist-type rain. In prior rainfall gauges, excessive amounts of water droplets would adhere to the rainwater collecting funnel with the result that with a very light mist-type rain little if any rainwater would enter the measuring flask.

SUMMARY OF THE INVENTION

An object of the invention is to provide a weather instrumentation station of the above type which renders highly accurate instrument readings even under the most adverse conditions.

A further object of the invention is to provide a rain gauge which renders highly accurate rainfall readings even in light, mist-type rains.

A further object of the invention is to provide a rain gauge of the above type which presents a minimal surface on which the rain drops travel from the collector funnel to the measuring flask.

A further object of the invention is to provide an outdoor weather instrumentation station that is portable.

Briefly, the foregoing objects are accomplished by the provision of an outdoor weather instrumentation station including an instrument housing adapted to receive a plurality of weather instruments therein, and an exterior radiation housing shield disposed over the instrument housing to shield the instrument housing from the sun. The housing shield is secured in spaced relation to the instrument housing to provide an air space therebetween. The housing shield is formed of outer and inner walls forming a double-walled structure, with the inner wall thereof being formed of either aluminized asbestos or a thermoplastic material. The outer wall is formed of stainless steel, such outer and inner walls being spaced from each other to provide an insulating air space therebetween. The roof of the shield is peaked to forestall accumulation of water and snow thereon. A chimney is provided to ensure adequate air circulation interiorly of the housing.

The housing shield has at least two spaced sides and a roof forming an enclosure open on the bottom and on opposite sides. An auxiliary shield may be positioned over at least one open side of the housing shield, in spaced relation to the housing shield and to the instrument housing, to shield the sun from the instrument housing on such one open side. The auxiliary shield is formed of outer and inner walls having an air space therebetween forming a double-walled structure. The inner wall of the auxiliary shield is formed of either aluminized asbestos or a thermoplastic material, and its outer wall is formed of stainless steel.

In another form, the housing shield may have at least three connected sides and a roof forming an enclosure open on one side.

Also, the instrument housing may have louvers to permit increased air circulation therein.

The composite weather instrumentation station may be disposed on a suitable pedestal having foldable or hinged legs to render the station portable.

In a modification of the invention, a rainwater gauge is provided including an upstanding elongated hollow housing open at the top end, an upstanding elongated hollow rainwater receiving flask open at the top end and disposed interiorly of the housing in spaced relation therein, and a hollow open-ended rainwater receiver funnel disposed on the top end of the housing for collecting rainwater and funneling it into the flask. The funnel has a lower portion having downwardly and inwardly converging walls converging at a predetermined angle to an outlet opening at the lower end of the funnel leading to the top open end of the flask. Also, the funnel has an upper portion having upwardly and inwardly converging walls converging at a predetermined angle to a rainwater receiving opening of larger cross-sectional area than the outlet opening. The ratio of the area of the rainwater receiving opening to the area of the outlet opening is preferably about ten to one.

In a further modification of the rainwater gauge, an open-ended funnel cylinder of minimal longitudinal length may be disposed in and connected to the perimeter of the funnel rainwater receiving opening to channel rainwater to the funnel outlet opening. The upper edge of the cylinder is a knife edge to ensure collecting a predetermined precise area of rainwater in the funnel, and the lower edge of the cylinder is a knife edge to partially overcome the surface tension of water droplets thereon and thus ease the passage of the water droplets through the cylinder. The funnel upper portion may be detachably secured to the funnel lower portion. The cylinder is formed of stainless steel, and its inner surface is coated with a hydrophobic coating. The cylinder may be detachable for cleaning and servicing.

Other objects and advantages of the invention will be apparent from the following description taken in conjunction with the drawings wherein:

DESCRIPTION OF THE PREFERRED EMBODIMENT

Figures 1, 2, 3:
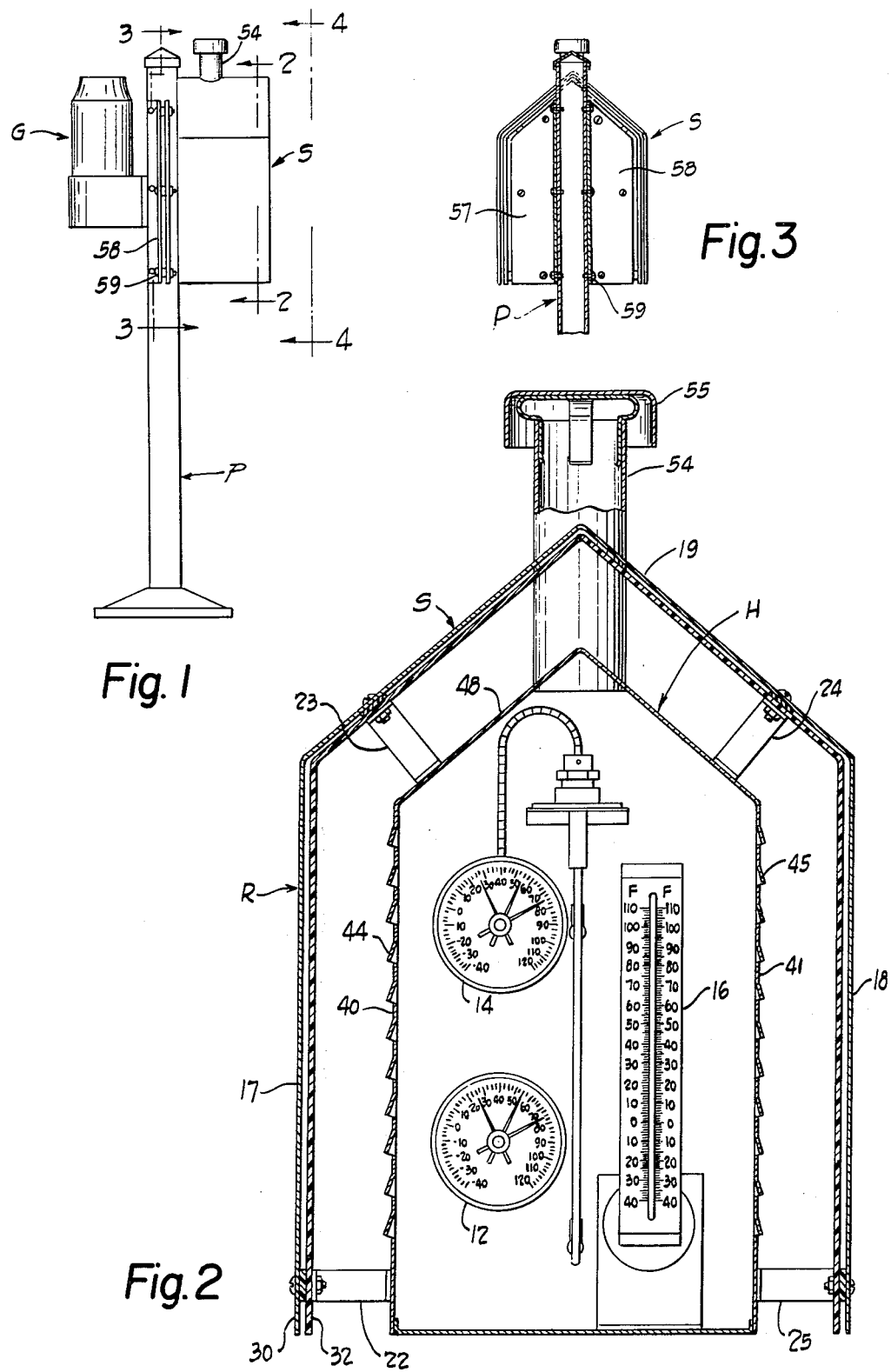
FIG. 1 is a side elevational view of a weather instrumentation station constructed in accordance with the invention.
FIG. 2 is a front elevational sectional view taken along the line 2—2 of FIG. 1, with the instrument housing being removed from the post.
FIG. 3 is a sectional view taken along the line 3—3 of FIG. 1.

In the drawings, like numbers and letters are used to illustrate like and similar parts throughout the several views.

Referring first to FIG. 1, there is shown a plurality of weather instruments disposed on a post or pedestal P including an outdoor weather instrumentation station S, and a separate rain gauge G.

The instrumentation station S includes an instrument housing H (FIG. 2) having a plurality of weather instruments therein such as, for example, the air temperature gauge 12, the soil temperature gauge 14 and the thermometer 16. Such instruments 12, 14 and 16 will not be described further in detail as the same, per se, form no part of the present invention.

As aforementioned, it is essential to position weather instruments in an outdoor exposed position to secure true readings. However, if the instruments are placed in a housing and such housing is placed in an exposed position, inaccurate readings result because of a rise in temperature interiorly of the housing from the sun and also because of poor air circulation in the housing. Prior attempts to alleviate these problems consisted of forming louvers in the housing walls and, additionally, placing a shield or roof over the housing to shield it from the sun. However, such shield or roof is not totally effective in lowering the housing interior temperature to the true air temperature. One reason is that the sun's infrared rays are not shielded. Also, louvered walls are not totally effective in providing ideal air circulation interiorly of the housing.

As best shown in FIG. 2, the housing H is provided with a radiation shield having spaced sides 17 and 18 and peaked roof 19 thus forming a structure open on the bottom and on opposite sides. The shield is secured to the housing H in spaced relation thereto by the brackets 22, 23, 24 and 25, to form an air space between the shield and housing. The shield R is a double-wall structure and is formed of an outer wall 30 preferably of stainless steel, and an inner wall 32 formed preferably of either aluminized asbestos or of a thermoplastic material. Such dual wall construction is very highly effective in shielding all visible and invisible (i.e. infrared) rays of the sun as well as the heat therefrom. Also, the radiation shield may have three connected sides and a roof forming an enclosure open on one side only.

Figures 4, 5:
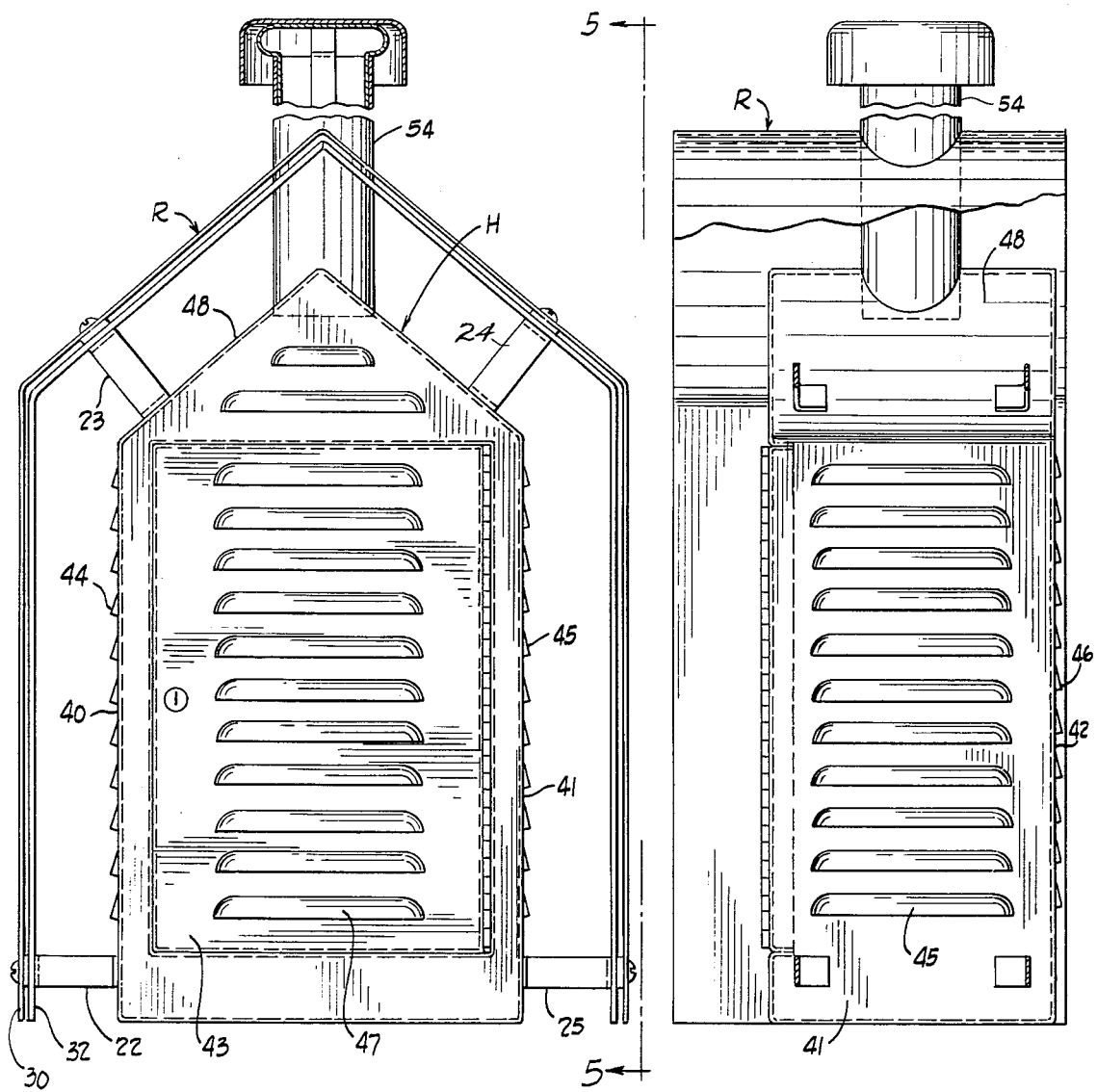
FIG. 4 is a front elevational view taken along the line 4—4 of FIG. 1, with the instrument housing being removed from the post.
FIG. 5 is a view taken along the line 5—5 of FIG. 4.

The housing H has spaced sides 40, 41, a rear side 42 (FIG. 5), and a front door 43 (FIG. 4), all having louvers 44, 45, 46 and 47, respectively, to provide interior air circulation. The housing H also has a peaked roof 48 to compliment the peaked roof of the radiation shield R and to allow heated air to rise and flow up the chimney 54, now to be described.

To prevent build-up of heated air in the upper portion of the housing H, a chimney 54 is provided which is secured to the housing peaked roof 48 and extends through the roof 19 of the radiation shield R as shown. The chimney 54 has a cap 55 secured to but spaced from the top of the chimney to prevent rainwater from entering the housing, yet allowing heated air to escape therefrom. The exterior exposed portion of the chimney may be coated with a black metallic oxide coating to heat the interior of the exterior portion of the chimney, thereby creating a draft up the chimney to further provide ambient flowing air interiorly of the housing H.

As shown in FIGS. 1 and 3, either a single or a pair of auxiliary radiation shields 57, 58 may be suitably secured to the post P (by the bolts 59) and positioned over the open side of the housing radiation shield R in spaced relation thereto to shield the sun from the housing H on such open side. The auxiliary shields 57, 58 are also of double-walled structure, with the outer wall being formed of stainless steel and the inner wall of aluminized asbestos or a thermoplastic material.

Figure 6:
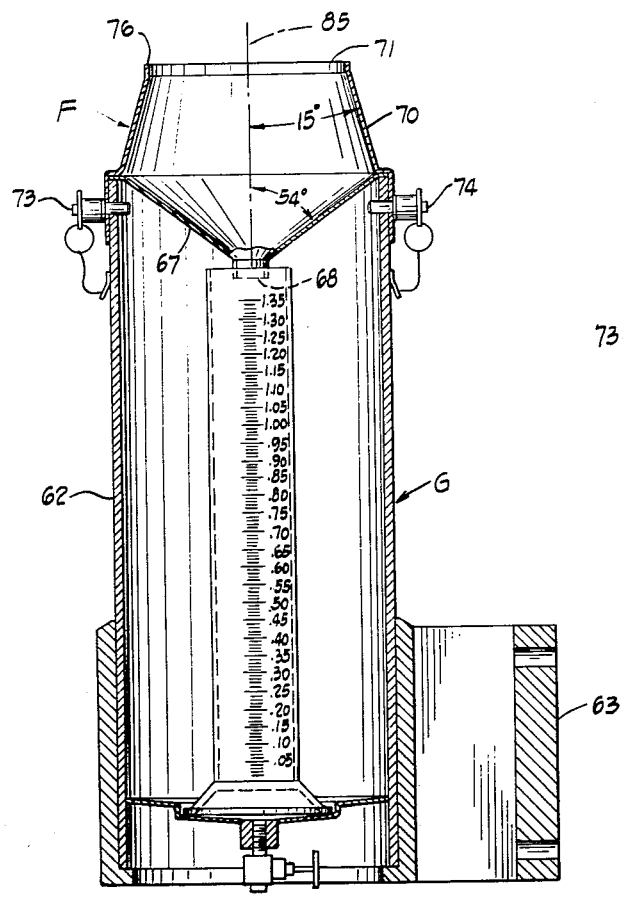
FIG. 6 is a side elevational sectional view of the rain gauge shown in FIG. 1.
Figure 7:
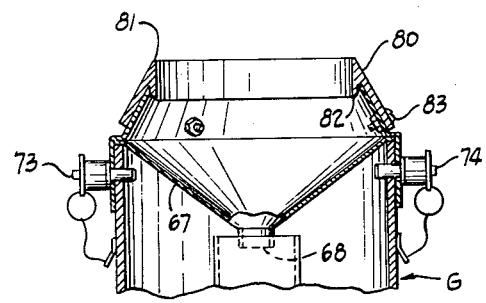
FIG. 7 is a portional sectional view of the upper portion of the rain gauge shown in FIG. 6 and showing a modification thereof.

Referring to FIGS. 6 and 7, there is shown the rainwater gauge G including an upstanding elongated hollow housing 62 open at the top end and supported on the bracket 63, an upstanding elongated hollow rainwater receiving flask 65 open at the top end and disposed interiorly of the housing 62 in spaced relation therein, and a hollow open-ended rainwater receiver funnel F disposed on the top end of the housing 62 for collecting rainwater and funneling it into the flask 65.

The funnel F has a lower portion 67 having downwardly and inwardly converging walls converging to an outlet opening 68 at the lower end of the funnel. The funnel F also has an upper portion 70 connected to the lower portion 67 and having upwardly and inwardly converging walls converging to a rainwater receiving opening 71 of a larger cross-sectional area than the outlet opening 68. The funnel F may be detachably secured to the housing 62 by means of the releasable pins 73, 74. The top edge 76 of the funnel upper portion 70 is a knife edge to ensure collecting a precise area of rainwater in the funnel. The ratio of the area of the rainwater receiving opening 71 to the area of the outlet opening 68 is preferably ten to one.

In a modification of the funnel F, an open-ended stainless steel cylinder 80 (FIG. 7) is disposed in the funnel upper portion 70 and connected to the perimeter of the rainwater receiving opening 71 to channel rainwater to the outlet opening 68. The upper edge 81 of the cylinder 80 is a knife edge to ensure collecting a predetermined precise area of rainwater in the funnel. Also, the lower edge 82 of cylinder 80 is a knife edge to partially overcome the surface tension of water droplets thereon and thus ease passage of water droplets through the cylinder.

The inner surfaces of the cylinder 80 and the funnel F may be coated with a hydrophobic material to ease passage of water droplets therethrough.

The cylinder 80 may be detachably secured to the funnel F by means of the bolt 83.

In a preferred form of the invention, the walls of the funnel lower portion 67 converge downwardly and inwardly toward the funnel vertical centerline 85 (FIG. 6) at an angle to such vertical centerline of between fifty and fifty-eight degrees, with the preferred angle being fifty-four degrees. Also, the walls of the funnel upper portion 70 converge upwardly and inwardly toward the funnel vertical centerline 85 at an angle to such vertical centerline of between twelve and eighteen degrees, with the preferred angle being fifteen degrees. These angles are the result of considerable experimentation and provide a funnel F that presents a minimal surface on which the raindrops travel from the funnel top opening 71 to the flask 65. More specifically, the less the surface on which the raindrops travel, the more accurate the flask readings, as the area of the surface on which the raindrops may cling to is minimal. In the average rainfall, the raindrops hit the funnel F at an angle to the vertical. The aforementioned fifteen degree angle has been found to be the most effective angle for the walls of the funnel upper portion to channel the raindrops as directly as possible to the funnel lower portion 67. Likewise, the fifty-four degree angle of the wall of the funnel lower portion 67 has been found to be the most effective angle to channel the raindrops as quickly as possible to the flask once they hit the lower portion of the funnel. Although the angle at which the raindrops initially enter the funnel varies with the speed of the wind, the aforementioned fifteen degree angle represents the compromise considering average wind speed among other factors.

Figure 9:
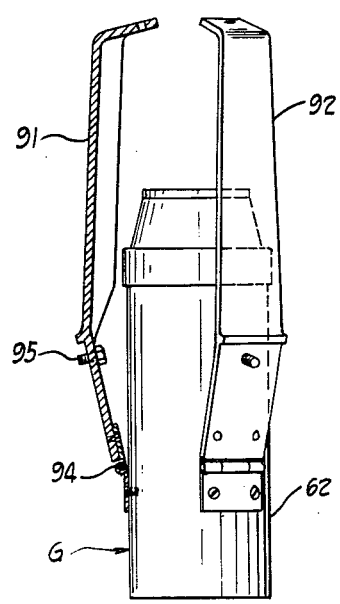
FIG. 9 is a view similar to FIG. 8, but showing the legs of the stand in collapsed position.
Figure 8:
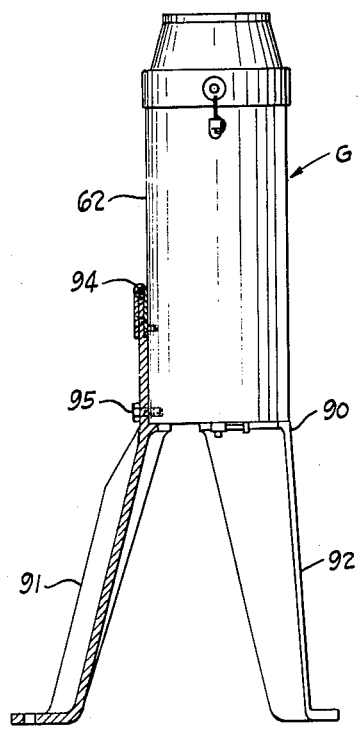
FIG. 8 is a side elevational sectional view showing the rain gauge of FIG. 6 disposed on a collapsible tripod stand.

Referring now to FIGS. 8 and 9, the rain gauge G may be disposed on a collapsible stand 90, having hinged legs 91, 92 (and a third leg which is not shown), such legs folding to a retracted position as shown in FIG. 9 thus rendering the rain gauge portable.

More specifically, the leg 91, for example, is hingedly secured to the housing 62 by means of the hinge 94. When the legs are swung down to normal standing position, they are detachably secured to the housing 62 by bolts such as, for example, the bolt 95 which detachably secures the leg 91 in standing position to the housing.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. An outdoor weather instrumentation station comprising, an instrument housing adapted to receive at least one weather instrument therein, a weather instrument disposed in said housing, an exterior housing radiation shield disposed over the roof and down and completely around the sides of the instrument housing to shield the instrument housing from the sun such that the sun cannot shine on any part of said housing, and means for securing the radiation shield in spaced relation to the instrument housing to provide an air space therebetween.

2. The structure of claim 1 wherein said housing has a chimney extending through the top of the housing and through the shield to increase air circulation interiorly of the housing.

3. The structure of claim 2 wherein the exterior portion of said chimney is coated with black metallic oxide to heat the interior of said exterior portion of the chimney thereby creating a draft up the chimney to provide ambient flowing air interiorly of the housing.

4. The structure of claim 1 wherein said radiation shield is formed of outer and inner walls forming a double-walled structure.

5. The structure of claim 4 wherein said inner wall of said double-walled housing shield is formed of a thermoplastic material.

6. The structure of claim 4 wherein said inner wall is formed of aluminized asbestos.

7. The structure of claim 4 wherein said outer wall of said double-walled housing shield is formed of stainless steel.

8. The structure of claim 4 wherein said outer and inner walls are spaced from each other to provide an air space therebetween.

9. The structure of claim 1 wherein said housing shield has at least two spaced sides and a roof forming an enclosure open on the bottom and on opposite sides.

10. The structure of claim 9 and further including at least one auxiliarly shield positioned over at least one open side of the housing shield in spaced relation to the housing shield and to the instrument housing to shield the sun from the instrument housing on said one open side, said auxiliary shield being formed of outer and inner walls having an air space therebetween forming a double-walled structure.

11. The structure of claim 10 wherein the inner wall of said double-walled auxiliary shield is formed of a thermoplastic material.

12. The structure of claim 10 wherein said outer wall of said double-walled auxiliary shield is formed of stainless steel.

13. The structure of claim 9 wherein said roof is peaked to forestall accumulation of water and snow thereon.

14. The structure of claim 1 wherein said housing shield has at least three connected sides and a roof forming an enclosure open on one side.

15. The structure of claim 1 wherein said instrument housing has louvers to permit air circulation therein.

16. The structure of claim 1 and further including a pedestal, and said weather instrumentation station is disposed on said pedestal.

* * * * *